(12) United States Patent
Morin et al.

(10) Patent No.: US 10,947,154 B2
(45) Date of Patent: Mar. 16, 2021

(54) HEATING DEVICE COMPRISING A GLAZING SUBSTRATE COATED ON BOTH SIDES

(71) Applicant: SAINT-GOBAIN GLASS FRANCE, Courbevoie (FR)

(72) Inventors: Camille Morin, Paris (FR); Arnaud Huignard, Compiegne (FR); Mathieu Urien, Fontenay Sous Bois (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 51 days.

(21) Appl. No.: 16/473,893

(22) PCT Filed: Dec. 22, 2017

(86) PCT No.: PCT/FR2017/053810
§ 371 (c)(1),
(2) Date: Jun. 26, 2019

(87) PCT Pub. No.: WO2018/122515
PCT Pub. Date: Jul. 5, 2018

(65) Prior Publication Data
US 2019/0337843 A1    Nov. 7, 2019

(30) Foreign Application Priority Data
Dec. 26, 2016 (FR) ..................... 16 63391

(51) Int. Cl.
*B32B 15/04* (2006.01)
*B32B 17/06* (2006.01)
*C03C 17/36* (2006.01)

(52) U.S. Cl.
CPC ........ *C03C 17/3686* (2013.01); *C03C 17/366* (2013.01); *C03C 17/3626* (2013.01);
(Continued)

(58) Field of Classification Search
CPC .............. B32B 17/06; B32B 2307/412; B32B 17/10036; B32B 2250/02;
(Continued)

(56) References Cited

U.S. PATENT DOCUMENTS 6,024,084 A *  2/2000 Gerhardinger ...... C03C 17/3417
                                                        126/200
6,320,164 B2 * 11/2001 Millett ................... F24C 15/04
                                                        126/200
(Continued)

FOREIGN PATENT DOCUMENTS

EP          1 293 726 A2      3/2003
FR          3 030 495 A1      6/2016
WO     WO 2016/097560 A1      6/2016

OTHER PUBLICATIONS

International Search Report as issued in International Application No. PCT/FR2017/053810, dated Apr. 10, 2018.

*Primary Examiner* — Lauren R Colgan
(74) *Attorney, Agent, or Firm* — Pillsbury Winthrop Shaw Pittman LLP

(57) ABSTRACT

A heating device equipped with a chamber defining a cavity, includes a door or wall incorporating a multiple glazing, the glazing including at least one transparent substrate coated on each face with a stack of thin layers, namely: on a first face, turned toward the cavity, a first stack that reflects heat essentially by virtue of one or more functional layers based on indium tin oxide; and on the other face, turned toward the exterior of the device, a second stack that reflects heat essentially by virtue of one or more functional layers based on a metal chosen from gold or silver.

16 Claims, 2 Drawing Sheets

Config. I (6)    Config. II (9)

Config. III (14)    Config. IV (15)    Config. V (17)    Config. VI (19)

(52) U.S. Cl.
CPC ...... *C03C 17/3642* (2013.01); *C03C 17/3644* (2013.01); *C03C 17/3649* (2013.01); *C03C 17/3681* (2013.01); *C03C 2217/212* (2013.01); *C03C 2217/213* (2013.01); *C03C 2217/216* (2013.01); *C03C 2217/231* (2013.01); *C03C 2217/256* (2013.01); *C03C 2217/261* (2013.01); *C03C 2217/281* (2013.01); *C03C 2217/948* (2013.01); *C03C 2218/152* (2013.01); *C03C 2218/156* (2013.01)

(58) Field of Classification Search
CPC .............. B32B 2260/023; B32B 17/00; B32B 17/10055; B32B 17/10064; B32B 2255/28; B32B 27/06; B32B 2209/00; C03C 17/366; C03C 17/3644; C03C 17/3411; C03C 17/36; C03C 17/3618; C03C 17/3681; C03C 2217/948; C03C 17/3613; C03C 2217/231; C03C 17/361; C03C 17/3642; C03C 2217/23; C03C 2217/24; C03C 2217/94; C03C 17/3626; C03C 17/3649; G02B 1/115; G02B 1/116; G02B 5/208; Y10T 428/12611; Y10T 428/12618
USPC ................ 428/426, 428, 432, 434, 701, 702
See application file for complete search history.

(56) References Cited

U.S. PATENT DOCUMENTS

| | | | | |
|---|---|---|---|---|
| 6,822,208 | B2* | 11/2004 | Henze | F24C 15/04 126/198 |
| 7,597,938 | B2* | 10/2009 | Thomsen | C03C 17/3417 427/165 |
| 8,097,342 | B2* | 1/2012 | Thomsen | C03C 23/007 428/428 |
| 8,834,976 | B2* | 9/2014 | Lemmer | C03C 17/36 428/34 |
| 9,499,438 | B2* | 11/2016 | Theios | C03C 17/3435 |
| 10,392,300 | B2* | 8/2019 | Boyce | C23C 14/34 |
| 2003/0113550 | A1* | 6/2003 | Millett | A47F 3/0434 428/432 |
| 2004/0253471 | A1* | 12/2004 | Thiel | B32B 15/09 428/544 |
| 2011/0210656 | A1* | 9/2011 | Lemmer | C03C 17/3417 312/405 |
| 2012/0021149 | A1* | 1/2012 | Myli | C03C 17/3411 428/34 |
| 2012/0084963 | A1 | 4/2012 | Thomsen et al. | |
| 2013/0089684 | A1* | 4/2013 | Pesce | E04B 1/78 428/34 |
| 2013/0129945 | A1* | 5/2013 | Durandeau | C03C 17/3441 428/34 |
| 2014/0010976 | A1* | 1/2014 | Gerardin | B32B 17/10761 428/34 |
| 2014/0237917 | A1 | 8/2014 | Theios et al. | |
| 2016/0002100 | A1* | 1/2016 | Melcher | C03C 17/3649 428/216 |
| 2018/0003394 | A1* | 1/2018 | Urien | C03C 17/3681 |

* cited by examiner

HEATING DEVICE COMPRISING A GLAZING SUBSTRATE COATED ON BOTH SIDES

CROSS REFERENCE TO RELATED APPLICATIONS

This application is the U.S. National Stage of PCT/FR2017/053810, filed Dec. 22, 2017, which in turn claims priority to French Patent Application No. 1663391 filed Dec. 26, 2016, the entire contents of all applications are incorporated herein by reference in their entireties.

The invention relates to a heating device equipped with a chamber defining a cavity, said cavity being closed by a wall or door incorporating a glazing confining the heat in the cavity of the device. The invention also relates to such a glazing and to its use as constituent element of such a device.

A heating device in general comprises a chamber defined by one or more walls including a glazed door. Heating means allow the cavity in the interior of the chamber to be heated to a high temperature. Such heating devices may in particular be ovens, fireplaces, kitchen ranges, etc.

The glazings used as constituent elements of a door or even of a wall of a heating device are in general multiple glazings, i.e. glazings comprising a plurality of glazing substrates, and in particular triple or quadruple glazings. These multiple glazing units contribute to keeping heat in the interior of the heating device while keeping the exterior surface of the glazing cold to the touch, in order to protect users from burns.

Such a multiple glazing comprises at least two substrates held a distance apart so as to define a space. The faces of the glazing are by convention numbered starting from the interior of the heating device, and the faces of the substrates are numbered from the interior to the exterior of the heating device.

Glazings used as constituent elements of a heating device may comprise substrates coated with functional coatings that reflect infrared (IR) radiation. These coatings allow the amount of energy transmitted to the exterior of the heating device to be decreased by reflecting the heat back toward the interior of the chamber. Use of such coatings decreases the power consumption of the heating device and heating of the external wall of the glazing forming the door of said oven.

For example, patent application EP1293726 A2 describes a glass barrier comprising, on a first surface, a heat-reflecting coating deposited by pyrolysis, and on a second surface, a heat-reflecting coating deposited by a physical-vapor-deposition (PVD) process.

Coatings comprising functional metal layers based on silver (or silver layers) are known to be the most effective way of decreasing the emissivity of glazings while preserving the optical and aesthetic qualities of the wall or door, and in particular the transparency thereof. These coatings also ensure a higher level of user protection, a lower power consumption and greater user comfort.

However, the thermal resistance of coatings comprising these silver-based functional metal layers is often insufficient. The low thermal and chemical resistance of these coatings may result, in the long term, in the appearance of defects such as spots of corrosion, scratches, dewetting of the silver, or even complete or partial delamination of the stack.

This effect is accentuated when such glazings incorporating thin silver layers are used in heating devices, for example as oven doors, and are subjected to long and repeated high-temperature heat-treatment cycles in a humid environment, as in pyrolysis processes. These heat-treatment cycles in a humid environment accelerate the degradation of the silver layers, in particular via dewetting or corrosion of the silver.

Furthermore, any defect or scratch, whether it be due to corrosion or to mechanical stresses, is liable to degrade not only the optical and energy performance of the coated substrate but also its aesthetics.

Patent application US 2012/0084963 however discloses a multiple glazing used as a constituent element of an oven door comprising a transparent substrate coated with a stack of thin layers comprising at least one silver-based functional metal layer and a zirconium-oxide-based protective top layer. The zirconium-oxide-based layers protect the stack during a high-temperature heat treatment. However, substrates coated with such protective layers are subject to corrosion in hot humid environments.

Patent application WO2016/097560 describes a glazing comprising a transparent substrate coated with a stack of thin layers comprising at least one silver-based functional metal layer, characterized in that the stack comprises a protective top layer based on titanium and zirconium oxide.

It is indicated in these patent applications that such a stack comprising a silver-based functional layer is sufficiently durable for the stack to be positioned on face 1 of the wall of the device.

Although the stacks described in the aforementioned publications in principle allow the required criteria of mechanical and chemical resistance to be met at the usual operating temperature of an oven, oven door and wall configurations in which the performance in terms of thermal insulation is optimal and that are easy to manufacture, preferably at lower cost, are currently still being researched.

An architecture is in particular sought that would allow not only an exterior face of the wall to remain cold on the exterior side, in order to guarantee user safety, but also heat to be effectively confined in the chamber or cavity of the device. Furthermore, it is desired for the device to consume as little power as possible, and in particular for the cooling of the wall thereof to require little or no additional action, such as for example a flow of cooling air through the various constituent glazings of said wall.

The aim of the present invention is to provide a heating device, and a glazing for integration into a door or wall of such a device, allowing the aforementioned problems to be effectively solved.

More particularly, the invention relates to a heating device equipped with a chamber defining a cavity, said device comprising a door or wall comprising a preferably multiple glazing, said glazing comprising at least one transparent substrate coated on each face with a stack of thin layers, namely:

on a first face, turned toward said cavity, a first stack that reflects heat essentially by virtue of one or more functional layers based on indium tin oxide; and on the other face, turned toward the exterior of the device, a second stack that reflects heat essentially by virtue of one or more functional layers based on a metal chosen from gold or preferably silver.

According to preferred embodiments of the present invention which may, where appropriate, be combined together:

The first stack is positioned, in the glazing, in contact with the cavity of the heating device.

The first stack comprises, as functional layer, an indium tin oxide in which the atomic percentage of Sn in the oxide is advantageously comprised in a range extending from 5 to 70% and in particular from 10 to 60%.

The first stack comprises as functional layer a layer of ITO comprising a proportion by weight of about 85 to 95% indium oxide and about 15 to 5% tin oxide.

The first stack comprises, in succession, starting from the substrate:
  at least one underlayer of a dielectric compound in particular chosen from silicon nitride and silicon oxide;
  an ITO functional layer; and
  at least one overlayer of a dielectric compound in particular chosen from silicon nitride, silicon oxide, or zinc tin oxide.

The first stack comprises, in succession, starting from the substrate:
  a first underlayer based on silicon nitride;
  a second underlayer based on silicon oxide;
  an ITO functional layer;
  a first overlayer based on silicon nitride; and
  a second overlayer based on silicon oxide.

The first stack comprises, in succession, starting from the substrate:
  at least one underlayer of a dielectric compound in particular chosen from silicon nitride, silicon oxide and zinc tin oxide;
  a first ITO functional layer;
  an intermediate layer of a dielectric compound, in particular chosen from silicon oxide, silicon nitride or zinc tin oxide;
  a second ITO functional layer; and
  at least one overlayer of a dielectric compound in particular chosen from silicon nitride, silicon oxide, or zinc tin oxide.

The second stack comprises at least one silver-based functional metal layer and at least two dielectric coatings, each dielectric coating including at least one dielectric layer, so that each silver-based layer is placed between two dielectric coatings.

The stack comprises at least one blocker layer located below, and in contact with, a silver-based functional metal layer, and/or at least one blocker layer located above, and in contact with, a silver-based functional metal layer.

The second stack has a normal emissivity lower than or equal to 10%, preferably lower than 5% and more preferably lower than or equal to 3%. By "normal emissivity" of a coating or a stack, what is meant is its normal emissivity at 283 K in the sense of standard NF-EN 12898 (2001), the stack normally being deposited on a clear glass of 4 mm thickness.

The stack comprises:
  a dielectric coating, located below the silver-based functional metal layer;
  optionally a blocker layer;
  a silver-based functional metal layer;
  optionally a blocker layer;
  a dielectric coating, located above the silver-based functional metal layer; and
  a protective top layer.

The stack comprises:
  a dielectric coating located below the silver-based functional metal layer comprising at least one dielectric layer based on aluminum and/or silicon nitride and optionally a dielectric layer having a stabilizing function, based on zinc oxide or zinc tin oxide;
  optionally a blocker layer;
  a silver-based functional metal layer;
  optionally a blocker layer;
  a dielectric coating located above the silver-based functional metal layer comprising at least one dielectric layer based on aluminum and/or silicon nitride; and
  a protective top layer.

The coated substrate of the two stacks is curved and/or tempered.

The glazing comprises at least one additional heat-reflecting coating, deposited on at least one other constituent substrate of the glazing.

Said additional heat-reflecting coating is more preferably placed on face 3 and/or 5 of the glazing, and very preferably on face 3 of the glazing.

Said additional heat-reflecting coating comprises as functional layer a transparent conductive oxide chosen from indium tin oxide (ITO) or a tin oxide that is doped in order to make it electrically conductive, in particular fluorine-doped tin oxide (SnO2:F) or antimony-doped tin oxide (SnO2:Sb); or said additional heat-reflecting coating is a stack comprising, as functional layer, at least one silver layer.

The glazing is a double glazing (i.e. with two glazing substrates).

The glazing is a triple glazing (i.e. with three glazing substrates).

The glazing is a quadruple glazing (i.e. with four glazing substrates).

The invention also relates to the glazing described above comprising a plurality of transparent substrate one substrate of which is coated on each face with a stack of thin layers, namely:
  on a first face, turned toward the exterior of said glazing, a first stack that reflects heat essentially by virtue of one or more functional layers based on indium tin oxide; and
  on the other face, turned toward the interior of the glazing, a second stack that reflects heat essentially by virtue of one or more functional layers based on a metal chosen from gold or preferably silver.

Furthermore, another subject of the present invention is a heating-device wall or door comprising a glazing such as described above, and in particular the use of such a glazing as a constituent element of the wall or of a door of a heating device equipped with a chamber and/or a cavity, such as an oven. Of course, all the features described above in relation to the heating device also pertain to said wall or door, although they are not repeated here for the sake of conciseness.

Other details on the implementation and/or production of the present invention are given below:

The glazing is preferably chosen from multiple glazings comprising at least two transparent substrates, which may be clear or tinted according to the invention.

Thus, the glazing according to the invention may comprise one or more transparent substrates coated with a stack of thin layers on each of the faces thereof such as described above. Furthermore, the glazing according to the invention may comprise one or more transparent substrates coated with a stack of thin layers on each of the faces thereof such as described above, said substrate facing the cavity of the chamber and the heat-reflecting stack, which reflects heat essentially by virtue of one or more functional layers made of the transparent conductive oxide ITO, being placed in immediate contact with the atmosphere of the cavity.

The transparent substrates used according to the invention are preferably made of a rigid inorganic material such as glass, especially soda-lime-silica glass, borosilicate glass or aluminosilicate glass, or glass-ceramic. According to one advantageous embodiment, the substrates are made of borosilicate glass, which resists very high temperatures well. The thickness of the one or more substrates generally varies between 0.5 mm and 19 mm. The thickness of the one or more substrates is preferably smaller than or equal to 6 mm, or even smaller than or equal to 4 mm. The transparent substrate coated with the two stacks may have undergone a high-temperature heat treatment chosen from an anneal, for example a flash anneal such as a laser or flame anneal, a temper and/or bending. The temperature of the heat treatment is greater than 400° C., preferably greater than 450° C. and better still greater than 500° C. The substrate coated with the stack can thus be bent and/or tempered. The substrate coated with stacks on each face is preferably made of tempered glass, in particular when it forms part of a glazing used as a constituent element of a heating device or of a fire-resistant door.

According to one embodiment, the glazing is a double glazing and includes two substrates, an exterior substrate and an interior substrate, and 4 faces. Face 1 is in the interior of the heating device and therefore forms the interior wall of the glazing. Faces 2 and 3 are in the interior of the double glazing. Face 4 is on the exterior of the heating device and therefore forms the exterior wall of the glazing.

According to another embodiment, the glazing is a triple glazing and includes three substrates, an exterior substrate, a central substrate and an interior substrate, and 6 faces. Face 1 is in the interior of the heating device and therefore forms the interior wall of the glazing. Faces 2 to 5 are in the interior of the triple glazing. Face 6 is on the exterior of the heating device and therefore forms the exterior wall of the glazing.

According to another embodiment, the glazing is a quadruple glazing and includes three substrates, an exterior substrate, a central substrate and an interior substrate, and 8 faces. Face 1 is in the interior of the heating device and therefore forms the interior wall of the glazing. Faces 2 to 7 are in the interior of the quadruple glazing. Face 8 is on the exterior of the heating device and therefore forms the exterior wall of the glazing or of the heating device according to the invention.

As regards the first stack comprising one or more functional layers made of transparent conductive oxide by way of functional heat-reflecting layers (and therefore no other conductive layers in particular made of a metal such as silver): according to the invention, any coating comprising a functional layer based on and preferably made of transparent conductive oxide of the ITO type, i.e. based on a mixed indium and tin oxide, is used. The expressions "based on" and "-based" are in particular understood, in the context of the present invention, to mean the same thing, namely that the layer in question comprises at least 80%, or even 90% and even 95% by weight of the compound in question. The layer may even advantageously consist or essentially consist of such a compound. Specifically, these conductive but nevertheless transparent layers have low emissivities, correlated with low resistivities or sheet resistances. They are layers of materials obtained by vacuum cathode sputtering and optionally vacuum magnetron cathode sputtering. Surprisingly, it has been found, according to the present invention, that such stacks provide a better performance, in terms of thermal isolation, than a stack the functional layer of which is based on fluorine-doped tin oxide ($SnO_2$:F). The latter material is conventionally deposited using a chemical process, such as for example chemical vapor deposition (CVD) or optionally plasma-enhanced chemical vapor deposition (PECVD). More particularly, unexpectedly, a much better performance is obtained when these ITO-based stacks are combined with, on the other face of the glazing substrate, a low-emissivity coating comprising a functional (reflective) layer made of silver. Preferably, the deposited stack is a stack the one or more functional layers of which are based on ITO. The atomic percentage of Sn in the oxide is advantageously comprised in a range extending from 5 to 70% and in particular from 10 to 60%. More particularly, according to the invention, a layer of a mixture of indium (III) oxide ($In_2O_3$) and tin (IV) oxide ($SnO_2$) is preferably used, the proportion by weight of the first being about 85 to 95% and the proportion by weight of the second about 15 to 5%.

According to one very preferred embodiment of the present invention, the stack deposited on the first face is a stack comprising two functional layers based on ITO, these two functional layers being separated by at least one layer of a dielectric material.

Each layer based on ITO may in particular possess a physical thickness comprised in a range extending from 20 to 80 nm and in particular from 30 to 80 nm. The cumulative physical thickness of all the layers based on ITO is preferably comprised in a range extending from 40 to 200 nm and in particular from 60 to 160 nm.

The or each intermediate dielectric layer is preferably based on a compound chosen from the oxides, the nitrides or the oxynitrides of silicon, of aluminum, of titanium, of tin, of zinc, of zirconium, of niobium, of nickel, chromium or one of the mixtures thereof. It preferably essentially consists of such a compound or indeed consists of such a compound.

More particularly, the one or more intermediate dielectric layers preferably essentially consist of a compound chosen from an oxide, nitride or oxynitride of silicon and/or aluminum, a nitride or an oxide of titanium, an oxide of nickel and chromium, a nitride of niobium, or an oxide of tin and zinc. Preferably, the or each intermediate dielectric layer is based on (or essentially consists of) silicon oxide, silicon nitride, titanium oxide, or zinc tin oxide. Silicon nitride and oxide are particularly preferred. Silicon nitride or zinc tin oxide are particularly appreciated because their refractive index is close to that of ITO, and hence their presence does not alter the optical properties of the stack. Preferably, the refractive index, at a wavelength of 550 nm, of the one or more intermediate layers (in particular the single intermediate layer) is at least 1.8 and in particular 1.9 and is advantageously comprised in a range extending from 1.8 to 2.5 and in particular from 1.9 to 2.2. The number of intermediate layers separating the layers based on ITO preferably varies from 1 to 5 and in particular from 1 to 3 or from 1 or 2. Advantageously, the stack of thin layers comprises at least two layers (in particular two layers) based on a transparent electrically conductive oxide, these layers being separated by at most two intermediate layers, and in particular by a single intermediate layer.

Among preferred combinations, the stack comprises (or consists of) in succession, starting from the substrate:
  an adhesion layer, for example based on or essentially consisting of silica;
  a first ITO layer;
  an intermediate dielectric layer, for example based on or essentially consisting of silica, silicon nitride or zinc tin oxide;
  a second ITO layer;
  a layer forming a barrier to oxygen, for example based on or essentially consisting of silicon nitride; and
  a low-refractive-index layer, for example based on or essentially consisting of silica.

As regards the second stack that reflects heat essentially by virtue of one or more functional layers based on a metal chosen from gold or preferably silver:

The layers based on gold or preferably based on silver are deposited between dielectric coatings that generally comprise a plurality of dielectric layers allowing the optical properties of the stack to be adjusted, and allow a sufficient transmission of light to allow the chamber to be seen into from the exterior. These dielectric layers also make it possible to protect the silver layer from chemical or mechanical attacks. The stack of thin layers therefore advantageously comprises at least one silver-based functional metal layer and at least two dielectric coatings, each dielectric coating including at least one dielectric layer, so that each functional metal layer is placed between two dielectric coatings.

The stack is deposited by cathode sputtering and in particular magnetic-field-assisted cathode sputtering (magnetron process). According to this advantageous embodiment, all the layers of the stack are deposited by magnetic-field-assisted cathode sputtering.

Unless otherwise indicated, the thicknesses mentioned in the present document are physical thicknesses. Thin layer is understood to mean a layer having a thickness of between 0.1 nm and 200 microns, depending on its nature and its composition.

Throughout the description, the substrate according to the invention is regarded as being positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one or more layers inserted between these two layers.

The functional metal layer here is typically based on silver and in general comprises at least 80%, preferably at least 90% and better still at least 95% or even at least 98% by weight silver, with respect to the weight of the functional layer. The silver-based metal functional layer preferably comprises less than 1.0% by weight of metals other than silver, with respect to the weight of the silver-based metal functional layer.

The thickness of the silver-based functional layers is, in increasing order of preference, from 5 to 20 nm, from 8 to 15 nm.

The stacks may comprise at least one blocker layer, the function of which is to protect the silver layers by preventing any degradation linked to the deposition of a dielectric coating or linked to a heat treatment. These blocker layers are preferably located in contact with the silver-based functional metal layers.

The stack may comprise at least one blocker layer located below, and in contact with, a silver-based functional metal layer, and/or at least one blocker layer located above, and in contact with, a silver-based functional metal layer.

Among the blocker layers conventionally used, mention may be made of blocker layers based on a metal chosen from niobium Nb, tantalum Ta, titanium Ti, chromium Cr or nickel Ni, or based on an alloy obtained from at least two of these metals, especially a nickel-chromium alloy (NiCr).

The thickness of each overblocker or underblocker layer is preferably:
at least 0.2 nm, or at least 0.5 nm, and/or
at most 5.0 nm, or at most 2.0 nm.

The dielectric coatings have a thickness of greater than 15 nm, preferably of between 15 and 50 nm and better still from 30 to 45 nm.

The expression "dielectric layers having a barrier function" is understood to mean a layer made of a material capable of forming a barrier to the high-temperature diffusion of water and oxygen, originating from the ambient atmosphere or from the transparent substrate, toward the functional layer. The dielectric layers having a barrier function may be based on silicon and/or aluminum compounds chosen from oxides, such as $SiO_2$, nitrides, such as silicon nitride $Si_3N_4$ and aluminum nitrides AlN, and oxynitrides $SiO_xN_y$, optionally doped using at least one other element. The dielectric layers having a barrier function may also be based on zinc tin oxide.

The expression "dielectric layers having a stabilizing function" is intended to mean a layer made of a material which is able to stabilize the interface between the functional layer and said layer. The dielectric layers with a stabilizing function are preferably based on crystallized oxide, especially based on zinc oxide, optionally doped by means of at least one other element such as aluminum. The dielectric layer(s) with a stabilizing function are preferably zinc oxide layers.

The dielectric layer(s) having a stabilizing function may be located above and/or below at least one silver-based functional metal layer or each silver-based functional metal layer, either directly in contact therewith or separated by a blocker layer.

According to one advantageous embodiment, the dielectric layer based on aluminum and/or silicon nitride preferably makes contact with the protective top layer, which may advantageously be based on titanium oxide or on titanium zirconium oxide such as described in patent application WO2016/097560. The dielectric layer based on silicon and/or aluminum nitride has a thickness:
of less than or equal to 100 nm, of less than or equal to 50 nm or of less than or equal to 45 nm, and/or
of greater than or equal to 15 nm, of greater than or equal to 20 nm or of greater than or equal to 25 nm.

According to this embodiment, the stack may for example comprise:
a dielectric coating, located below the silver-based functional metal layer;
optionally a blocker layer;
a silver-based functional metal layer;
optionally a blocker layer;
a dielectric coating, located above the silver-based functional metal layer; and
a protective top layer.

According to one embodiment, the stack comprises:
a dielectric coating located below the silver-based functional metal layer comprising at least one dielectric layer based on aluminum and/or silicon nitride and optionally a dielectric layer having a stabilizing function, based on zinc oxide;
optionally a blocker layer;
a silver-based functional metal layer;
optionally a blocker layer;
a dielectric coating located above the silver-based functional metal layer comprising at least one dielectric layer based on aluminum and/or silicon nitride; and
a protective top layer.

According to another possible embodiment of the invention, the second stack may comprise a plurality of functional layers based on a metal chosen from gold or preferably silver, and in particular two or three layers made of silver, each thereof being separated from the following preferably by at least one layer of dielectric material in particular such as those described above.

According to one such embodiment, the stack may for example comprise:
- a dielectric coating, located below the silver-based functional metal layer;
- optionally a blocker layer;
- a first silver-based functional metal layer;
- optionally a blocker layer;
- a dielectric coating, located above the first silver-based functional metal layer;
- optionally a blocker layer;
- a second silver-based functional metal layer;
- optionally a blocker layer;
- a dielectric coating, located above the second silver-based functional metal layer and
- a protective top layer.

BRIEF DESCRIPTION OF THE DRAWINGS

Various embodiments of the present invention are presented below with reference to FIG. 1 which is appended hereto.

EXAMPLES

According to the invention, the thin-layer stacks defined below were deposited on a first substrate made of 4 mm thick clear soda-lime glass.

On a first face of the substrate, a stack according to example 1 of patent application WO2015/033067 was deposited.

More precisely, the following stack A was deposited by AC magnetron cathode sputtering on a 4 mm thick clear soda-lime-silica glass substrate:

Glass/$SiN_x$ (2 nm)/$SiO_2$ (34 nm)/ITO (118 nm)/$SiN_x$ (6 nm)/$SiO_2$ (65 nm)/$TiO_2$ (3 nm).

The numbers between parentheses correspond to the physical thicknesses deposited for each layer, expressed in nanometers.

The layers of silicon oxide and of silicon nitride were deposited, using aluminum-doped (to 8 at %) silicon targets, in an argon plasma with addition of oxygen and nitrogen, respectively. The ITO layers were deposited using ITO targets in an argon plasma. The ITO layer consisted of a mixture of indium (III) oxide ($In_2O_3$) and tin (IV) oxide ($SnO_2$), the proportion by weight of the first being about 90% and the proportion by weight of the second about 10%. The $SiN_x$ barrier layer was deposited at a pressure of 2.0 μbar. The normal emissivity of this stack, such as measured according to standard FR-EN 12898, was 18%.

On the second face of the substrate, the following stack B, which included a silver functional layer, and the normal emissivity of which was 3%, was deposited using conventional cathode sputtering deposition techniques:

Glass/$SiN_x$ (30 nm)/ZnO (5 nm)/NiCr (0.5 nm)/Ag (12 nm)/NiCr (0.5 nm)/ZnO (5 nm)/$SiN_x$ (30 nm)/$TiO_2$ (3 nm).

Figure 1:
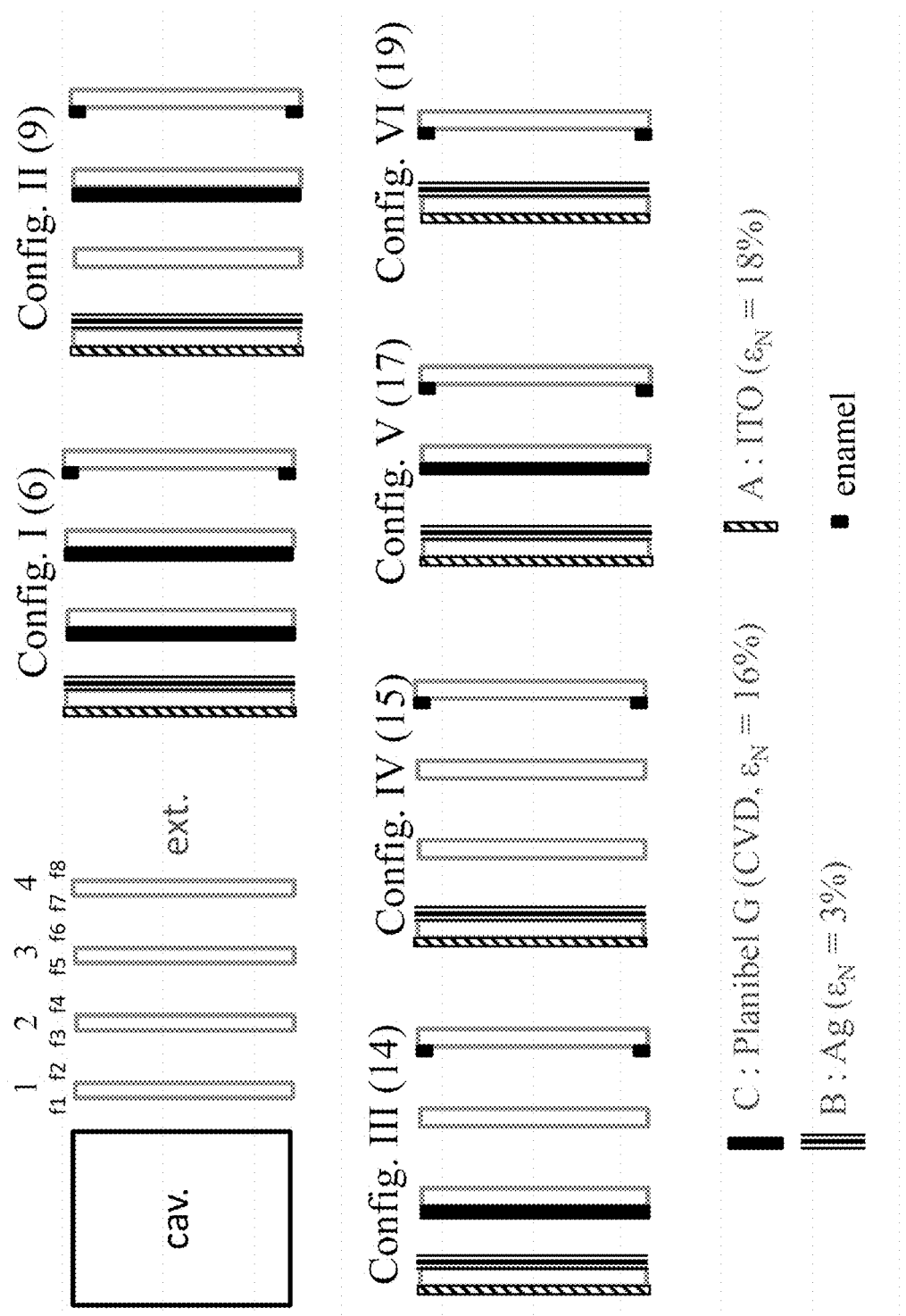
FIG. 1 illustrates three examples of heating devices comprising multiple glazings according to the invention, a glazing comprising 4 substrates (configurations I to IV), a triple glazing (configuration V) and a double glazing (configuration VI).

This substrate coated on its two faces was then installed into the wall of an oven, in association with one or more other glazing substrates as indicated in the configurations illustrated in FIG. 1.

According to the invention, the substrate described above was positioned in direct contact with the chamber of the oven, in such a way that the first stack, the functional layer of which was made of ITO, was turned toward said chamber (face 1 of the glazing) and the second stack, the functional layer of which was made of silver, was positioned on face 2 of the constituent glazing of the wall of the oven.

In configurations I to IV, the wall comprises four glazing substrates:
- a first substrate according to the invention such as described above; and
- then three successive glazing substrates, the faces of which were successively numbered from 2 to 8 (see FIG. 1).

In configuration I, the two intermediate substrates were examples of the glazing product sold by the AGC under the reference Planibel G®. They each comprised, on one face, a coating C, deposited by pyrolysis-CVD, consisting of a layer of fluorine-doped tin oxide. The face comprising the coating was turned toward the cavity of the oven (i.e. faces 3 and 5 of the wall).

Configuration III was identical to configuration II except that the second substrate was coated with no stack of thin layers.

Configuration IV was identical to configuration II except that the third substrate was coated with no stack of thin layers.

In configuration V, the wall comprised only three glazing substrates: a first substrate according to the invention such as described above, then two successive glazing substrates, the faces of which were successively numbered from 2 to 6. The intermediate substrate was a Planibel G® and the coating was positioned on face 3 of the glazing.

In configuration VI, the wall comprised only two glazing substrates: a first substrate according to the invention such as described above, then a substrate that was coated with no stack of thin layers.

Figure 2:
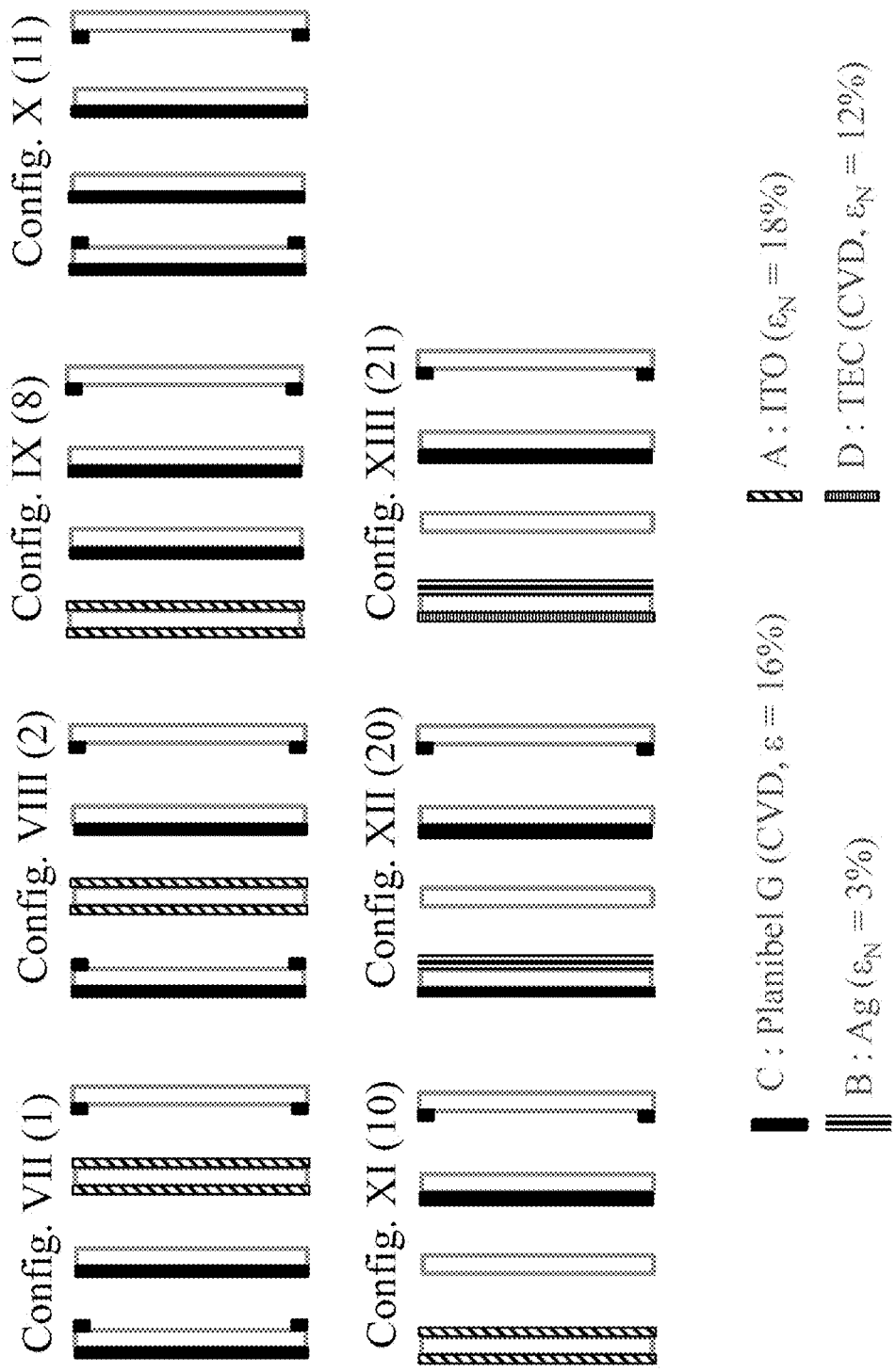
FIG. 2 illustrates multiple glazings according to comparative configurations.

Subsequently, comparative configurations were prepared, shown in FIG. 2, in which configurations the various heat-reflecting stacks were positioned on other faces of the quadruple glazing. More specifically:
- In configuration VII, coating C (Planibel) was positioned on faces 1 and 3 and stack A (ITO) on faces 5 and 6 of the glazing.
- In configuration VIII, stack C was positioned on faces 1 and 5 and stack A on faces 3 and 4 of the glazing.
- In configuration IX, stack A was positioned on faces 1 and 2 and coating C on faces 3 and 5 of the glazing.
- In configuration X, stack A was positioned on faces 1, 3 and 5 of the glazing.
- In configuration XI, stack A was positioned on faces 1 and 2 and coating C on face 5 of the glazing.

Two configurations according to the teaching of patent application EP1293726A2, comprising transparent-conductive-oxide layers deposited by pyrolysis-CVD on face 1 of the glazing, were also prepared by way of comparative examples. Specifically, two commercial glazing substrates comprising, on one face, a layer of $SnO_2$:F deposited by CVD-pyrolysis, were used by way of first substrate making contact with the cavity:

the Planibel glazing product described above; and
a glazing product sold by NSG under the reference TECO, in which the heat-reflecting stack has an emissivity of 12% (coating D).

More specifically:

In configuration XII, the silver-based stack B described above was deposited on a Planibel substrate, on the face not covered with the pyrolytic stack. This comparative substrate was substituted for the first substrate in the four-substrate wall of example II, the pyrolytic functional layer (coating C) being turned toward said chamber (face 1 of the glazing).

In configuration XIII, the silver-based stack B described above was deposited on that face of the TEC product which was not covered with the pyrolytic stack. This comparative substrate was substituted for the first substrate in the four-substrate wall of example II, the pyrolytic functional layer (coating D) being turned toward said chamber (face 1 of the glazing).

The chamber equipped with the various doors was then heated to a temperature of about 425° C. to 430° C. and the temperatures between each constituent substrate of the wall were measured using thermocouples in a conventional manner. The results are given in table 1 below:

In table 1, a face coated with the stack A (comprising the ITO functional layer and of 18% emissivity) is denoted A, a face coated with the stack B (comprising the silver functional layer) is denoted B, a face coated with the coating C (comprising the pyrolytic $SnO_2$:F layer of 16% emissivity) is denoted C, a face coated with the coating D (comprising the pyrolytic $SnO_2$:F layer of 12% emissivity) is denoted D and an uncoated face is denoted X.

temperature between the two first substrates, which decrease was observed by virtue of the particular configuration of the stacks present on the first substrate, thus allows the cavity to be better insulated, this resulting in a number of advantages:

In the case of a pyrolytic oven, such an improvement in insulation allows the heating required to maintain the high temperatures required for said pyrolysis to be limited.

During normal use of the oven to cook food (i.e. at a maximum temperature of 240° C.), this better insulation allows the power consumption of the oven to be significantly decreased and therefore the energy rating thereof to be improved.

Furthermore, the ventilation used to cool the glazing portions of the wall may be greatly decreased or may even no longer be required.

According to another advantage, it becomes possible according to the invention to use, in such walls, stacks the functional layer of which is made of silver and that are not specifically configured to resist heat, because of the substantial decrease in the temperature "seen" by said coatings in phases of cleaning the oven by pyrolysis. Furthermore, the use of a wall according to the invention could allow the configuration of the door to be simplified (3- rather than 4-pane configuration), as example IV shows, while ensuring the required safety levels.

Lastly, in the case of a conventional (non-pyrolytic) oven, the walls of which comprise only two or three glazing substrates, it may be seen that entirely suitable, and even improved, insulation levels may be obtained.

Comparison of examples II, XII and XIII shows that only the particular combination of coatings according to the

TABLE 1

| trial | F1 | F2 | F3 | F4 | F5 | F6 | F7 | F8 | Door exterior Tmax door | Intermediate glass Tmax (S1-S2) | Tmax (S2-S3) | Tmax (S3-S4) | Cavity Tav |
|---|---|---|---|---|---|---|---|---|---|---|---|---|---|
| I | A | B | C | X | C | X | X | X | 65 | 133 | 135 | 99 | 431 |
| II | A | B | X | X | C | X | X | X | 63 | 118 | 130 | 84 | 430 |
| III | A | B | C | X | X | X | X | X | 67 | 108 | 119 | 69 | 428 |
| IV | A | B | X | X | X | X | X | X | 65 | 146 | 119 | 71 | 421 |
| V | A | B | C | X | X | X | — | — | 65 | 175 | 102 | NA | 423 |
| VI | A | B | X | X | — | — | — | — | 70 | 158 | NA | NA | 423 |
| VII | C | X | C | X | A | A | X | X | 67 | 236 | 152 | 108 | 426 |
| VIII | C | X | A | A | C | X | X | X | 71 | 241 | 161 | 102 | 427 |
| IX | A | A | C | X | C | X | X | X | 68 | 233 | 147 | 86 | 424 |
| X | C | X | C | X | C | X | X | X | 71 | 239 | 162 | 103 | 425 |
| XI | A | A | X | X | C | X | X | X | 68 | 231 | 158 | 92 | 423 |
| XII | C | B | X | X | C | X | X | X | 60 | 217 | 169 | 76 | 426 |
| XIII | D | B | X | X | C | X | X | X | 62 | 131 | 146 | 77 | 429 |

In table 1, "Tmax door" indicates the maximum temperature measured on the door exterior, "Tmax S1-S2" the maximum temperature measured in the space between substrate 1 and substrate 2, "Tmax S2-S3" the maximum temperature measured in the space between substrate 2 and substrate 3, and "Tmax S3-S4" the maximum temperature measured in the space between substrate 3 and substrate 4.

The results given in table 1 demonstrate the advantages of the present invention: examples I to IV according to the invention comprising a wall the first substrate of which is coated, on the face turned toward the cavity of the oven, with a coating comprising an ITO functional layer and on the other face with a coating comprising a silver functional layer allowed said cavity to be better insulated, as the substantial decrease in the temperature in the space between said first substrate and the second substrate shows. The decrease in invention allows such a result to be obtained. In particular, very surprisingly and unexpectedly, it may be seen that the replacement of a tin-based pyrolytic TCO coating with an ITO-based stack of layers according to the invention allows the insulation properties of the wall to be significantly improved, even though the emissivity measured for said tin-based pyrolytic TCO coatings is lower than that of said ITO-based stack of layers.

Examples I, II and III furthermore show, if compared with example IV, that the thermal insulation of the cavity may be further improved if an additional heat-reflecting coating, of the TCO ($SnO2$:F or ITO) type or a silver-containing stack, is placed on face 3 and/or 5 of the glazing, and in particular on face 3 of the glazing.

The invention claimed is:

1. A heating device equipped with a chamber defining a cavity, said device comprising a door or wall incorporating a multiple glazing, said glazing comprising at least one transparent substrate coated on each face with a stack of thin layers, namely:
   on a first face, turned toward said cavity, a first stack that reflects heat essentially by virtue of one or more functional layers based on indium tin oxide; and
   on a second face, turned toward the exterior of the device, a second stack that reflects heat essentially by virtue of one or more functional layers based on a metal chosen from gold or silver.

2. The heating device as claimed in claim 1, wherein the first stack is positioned, in the glazing, in contact with the cavity of the heating device.

3. The heating device as claimed in claim 1, wherein the first stack comprises, as functional layer, an indium tin oxide the atomic percentage of Sn of which in the oxide is comprised in a range extending from 5 to 70%.

4. The heating device as claimed in claim 1, wherein the first stack comprises as functional layer a layer of indium tin oxide comprising a proportion by weight of about 85 to 95% indium oxide and about 15 to 5% tin oxide.

5. The heating device as claimed in claim 1, wherein the first stack comprises, in succession, starting from the substrate:
   at least one underlayer of a dielectric compound;
   an ITO functional layer; and
   at least one overlayer of a dielectric compound.

6. The heating device as claimed in claim 5, wherein
   the at least one underlayer of a dielectric compound is chosen from silicon nitride, silicon oxide or zinc tin oxide; and
   the at least one overlayer of a dielectric compound is chosen from silicon nitride, silicon oxide, or zinc tin oxide.

7. The heating device as claimed in claim 1, wherein the first stack comprises, in succession, starting from the substrate:
   at least one underlayer of a dielectric compound;
   a first ITO functional layer;
   an intermediate layer of a dielectric compound;
   a second ITO functional layer; and
   at least one overlayer of a dielectric compound.

8. The heating device as claimed in claim 7, wherein
   the at least one underlayer of a dielectric compound is chosen from silicon nitride, silicon oxide or zinc tin oxide;
   the intermediate layer of a dielectric compound is chosen from silicon oxide, silicon nitride or zinc tin oxide; and
   the at least one overlayer of a dielectric compound is chosen from silicon nitride, silicon oxide, or zinc tin oxide.

9. The heating device as claimed in claim 1, wherein the second stack comprises at least one silver-based functional metal layer and at least two dielectric coatings, each dielectric coating including at least one dielectric layer, so that each silver-based layer is placed between two dielectric coatings.

10. The heating device as claimed in claim 1, wherein the second stack has a normal emissivity, measured according to standard EN 12898, lower than or equal to 10%.

11. The heating device as claimed in claim 1, wherein the glazing is a multiple glazing comprising two, three or four substrates.

12. The heating device as claimed in claim 1, wherein at least the coated substrate of the stack is curved and/or tempered.

13. The heating device as claimed in claim 1, wherein the glazing comprises at least one additional heat-reflecting coating deposited on at least one other constituent substrate of the glazing.

14. The heating device as claimed in claim 13, wherein said additional heat-reflecting coating is placed on a third face and/or on a fifth face of the glazing, from the interior to the exterior of said heating device.

15. The heating device as claimed in claim 13, wherein said additional heat-reflecting coating comprises, as functional layer, a transparent conductive oxide chosen from indium tin oxide or a tin oxide that is doped in order to make it electrically conductive or wherein said additional heat-reflecting coating is a stack comprising, as functional layer, at least one silver layer.

16. The heating device as claimed in claim 1, wherein the metal is silver.

* * * * *